United States Patent
MacDougall et al.

(10) Patent No.: US 9,412,012 B2
(45) Date of Patent: Aug. 9, 2016

(54) Z-AXIS DETERMINATION IN A 2D GESTURE SYSTEM

(71) Applicant: QUALCOMM Incorporated, San Diego, CA (US)

(72) Inventors: Francis Bernard MacDougall, Milton (CA); Shaun William Van Dyken, San Diego, CA (US); Evan Robert Hildreth, Thornhill (CA)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 14/322,828

(22) Filed: Jul. 2, 2014

(65) Prior Publication Data

US 2015/0104075 A1 Apr. 16, 2015

Related U.S. Application Data

(60) Provisional application No. 61/891,841, filed on Oct. 16, 2013.

(51) Int. Cl.
*G06K 9/00* (2006.01)
*G06F 3/01* (2006.01)
*G06K 9/46* (2006.01)

(52) U.S. Cl.
CPC ............ *G06K 9/00355* (2013.01); *G06F 3/017* (2013.01); *G06K 9/4647* (2013.01)

(58) Field of Classification Search
CPC .. G06K 9/00355; G06K 9/4647; G06F 3/017; G06F 3/0481; G06F 3/04812; G06T 2207/30196; G06T 7/0042
USPC ........................................................ 382/106
See application file for complete search history.

(56) References Cited

U.S. PATENT DOCUMENTS

| | | | |
|---|---|---|---|
| 8,472,665 B2 | 6/2013 | Hildreth | |
| 8,615,108 B1 | 12/2013 | Stoppa et al. | |
| 8,666,115 B2 * | 3/2014 | Perski et al. | 382/103 |
| 2010/0315413 A1* | 12/2010 | Izadi et al. | 345/419 |

(Continued)

FOREIGN PATENT DOCUMENTS

WO 2013035554 A1 3/2013
WO 2013124845 A1 8/2013

OTHER PUBLICATIONS

Baskan S., et al., "Projection based method for segmentation of human face and its evaluation", Pattern Recognition Letters, Elsevier, Amsterdam, NL, vol. 23. No. 14, Dec. 1, 2002, pp. 1623-1629, XP004372130, ISSN: 0167-8655. DOI:10.1016/S0167-8655(02)00037-5.
International Search Report and Written Opinion—PCT/US2014/059169—ISA/EPO—Dec. 15, 2014.
Kumar A., et al., "Personal authentication using hand images", Pattern Recognition Letters, Elsevier, Amsterdam, NL, vol. 27, No. 13, Oct. 1, 2006, pp. 1478-1486, XP027922633, ISSN: 0167-8655. [retrieved on Oct. 1, 2006].
Shobha G., "Development of Palmprint Verification System Using Biometrics", Journal of Software, vol. 17, No. 8, Jan. 1, 2006, p. 1824, XP055156860, ISSN: 1000-9825. DOI: 10.1360/jos171824.

*Primary Examiner* — Yon Couso
(74) *Attorney, Agent, or Firm* — Silicon Valley Patent Group LLP

(57) ABSTRACT

Systems, apparatus and methods for determining a gesture are presented. According to some aspects, disclosed are systems, apparatus and methods for determining a gesture that compares different images and deduces a direction and/or distance based on a relative size change of a palm in the different images. After a reference palm size is registered, subsequent palm sizes are compared to the reference to determine if and/or how much the hand is moving. The hand gesture is determined based on these relative changes in hand movement.

23 Claims, 9 Drawing Sheets

(56) References Cited

U.S. PATENT DOCUMENTS

| | | |
|---|---|---|
| 2011/0013807 A1 | 1/2011 | Lee et al. |
| 2013/0057469 A1 | 3/2013 | Ajika |
| 2013/0278503 A1 | 10/2013 | Hirata |
| 2014/0118244 A1* | 5/2014 | Kaplan et al. ............... 345/156 |
| 2015/0185851 A1* | 7/2015 | Kauffmann et al. ......... 382/106 |

* cited by examiner

Z-AXIS DETERMINATION IN A 2D GESTURE SYSTEM

CROSS-REFERENCE TO RELATED APPLICATIONS

This application claims the benefit of and priority under 35 U.S.C. §119(e) to U.S. Provisional Application No. 61/891,841, filed Oct. 16, 2013, and entitled "Z-axis determination in a 2D gesture system," which is incorporated herein by reference in its entirety.

BACKGROUND

I. Field of the Invention

This disclosure relates generally to systems, apparatus and methods for determining a direction, and more particularly to determining a direction, change in distance and/or distance from a camera to a hand making gestures.

II. Background

Many mobile devices today contain a camera to capture images, for example, containing a hand. A standard two-dimensional (2D) camera image provides accurate measurements perpendicular to the camera (referred to here as a plane parallel to the x-axis and y-axis of the camera) but unfortunately little or no information about a perpendicular distance (along the z-axis of the camera) from the camera to the hand. A depth sensor or stereo cameras may provide distance information, thus supplementing a single camera. Other methods estimate an absolute perpendicular distance, usually based upon anatomical models of the hand, but are sensitive to variations in hands between different people, are sensitive to differences in poses and/or require a predefined pose to operate. What is needed is a means to determine a gesture involving a perpendicular distance to a hand using a standard 2D camera image, independently of assumption of a user's hand size and independently of hand pose.

BRIEF SUMMARY

Disclosed are systems, apparatus and methods for determining a gesture. According to some aspects, disclosed is a method for determining a gesture that compares different images and deduces a direction and/or distance based on a relative hand size. After a reference hand size is registered, subsequent hand sizes are compared to the reference to determine if and/or how much the hand is moving. The hand gesture is determined based on changes in the moving hand.

According to some aspects, disclosed is a method in a mobile device for determining a gesture, the method comprising: capturing a first image containing a hand having a first size; computing a first indication of the first size of the hand in the first image; capturing a second image containing the hand having a second size; computing a second indication of the second size of the hand in the second image; computing a relative change between the first image and the second image; and determining the gesture based on the relative change.

According to some aspects, disclosed is a mobile device for determining a gesture, the mobile device comprising: a camera configured to: capture a first image containing a hand having a first size; and capture a second image containing the hand having a second size; and a processor coupled to the camera and comprising code to: compute a first indication of the first size of the hand in the first image; compute a second indication of the second size of the hand in the second image; compute a relative change between the first image and the second image; and determine the gesture based on the relative change.

According to some aspects, disclosed is a mobile device for determining a gesture, the mobile device comprising: means for capturing a first image containing a hand having a first size; means for computing a first indication of the first size of the hand in the first image; means for capturing a second image containing the hand having a second size; means for computing a second indication of the second size of the hand in the second image; means for computing a relative change between the first image and the second image; and means for determining the gesture based on computing the relative change.

According to some aspects, disclosed is a non-transient computer-readable storage medium including program code stored thereon, comprising program code to: capture a first image containing a hand having a first size; compute the first indication of the first size of the hand in the first image; capture a second image containing the hand having a second size; compute the second indication of the second size of the hand in the second image; compute a relative change between the first image and the second image; and determine the gesture based on computing the relative change.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

As used herein, a device, sometimes referred to as a mobile device, a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable device without such a wireless link. The term "mobile device" is intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

Figure 1:
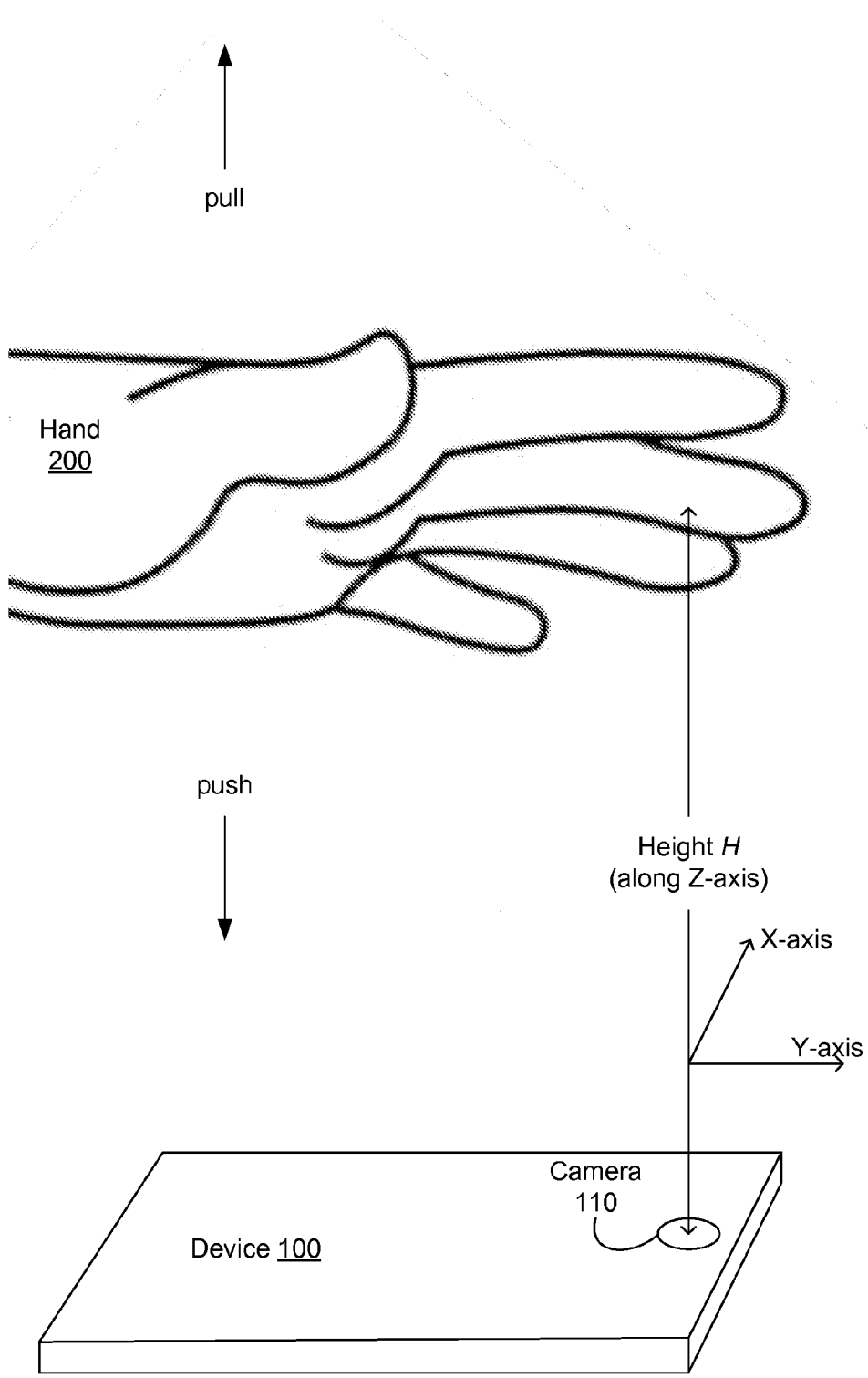
FIG. 1 shows a mobile device with a nearby gesturing hand.

FIG. 1 shows a mobile device 100 with a nearby gesturing hand 200. The hand 200 may be pushing towards or pulling away from the mobile device 100 or may be performing a more complex gesture. Usually, a distance between a camera 110 in the mobile device 100 and a hand 200 is unknown without a depth sensor, such as a stereoscopic camera, time-of-flight sensor, or structured light sensor. Some embodiments described herein register a hand size defining a reference size S. The hand size may be determined in various ways. For example, in some embodiments, hand size is estimated by filling the hand with a circle and using the radius, diameter or area of that circle to represent the size of the hand. In some embodiments, hand size is estimated by filling the hand with a square and using a width or area of the square to represent the hand. Other geometric shapes, such as a rectangle or oval, or single dimensions such as hand width, may be used. Alternatively, hand size may be estimated by encompassing a hand in a geometric shape rather than encompassing a geometric shape in a hand. For example, hand size may be estimated by the smallest square that encompasses a hand. For the description below, diameter of a circle that fits within a palm is used as an approximation of hand size.

In some embodiments, hand size is estimated with a palm size S, where the palm size S is a linear dimension. In other embodiments, the hand size is estimated with a palm area A. A palm is minimally influenced by the hand pose and orientation. As a result, the palm size S and palm area A are advantageous over the hand size, hand area, hand dimensions (such as, width W and length L) because these hand measurements are highly influenced by hand pose. On the other hand, palm size and palm area are advantageously less influenced by hand pose. For example, a hand in an open pose has a hand length and hand area that includes the length of the fingers, while a hand in a closed fist pose has a hand length and hand area that excludes the length of the fingers. Therefore, the hand length and hand area changes significantly depending on whether the hand is open or closed, however, the palm size remains similar throughout a variety of hand poses. Therefore, relative palm sizes are more relevant even if a hand pose changes.

A first indication of hand size may occur or be set to a first time a hand 200 is in a distinctive pose or other reference pose. A distinctive pose or reference pose may be an engagement pose, indicating to the system impending movement of the hand is to be interpreted as a gesture. For example, a first time a hand 200 provides a silhouette of a hand 200 with four fingers and a thumb, such as with a flat hand 200 perpendicular to a camera with a palm facing directly towards or away the camera. The figure shows a palm of a flat hand 200 facing directly towards a camera 110 of a mobile device 100. The camera 110 defines Cartesian coordinate with an x-axis and a y-axis in a plane on an image captured by the camera 110 and a z-axis perpendicular axis to the image plane.

Figures 2, 3:
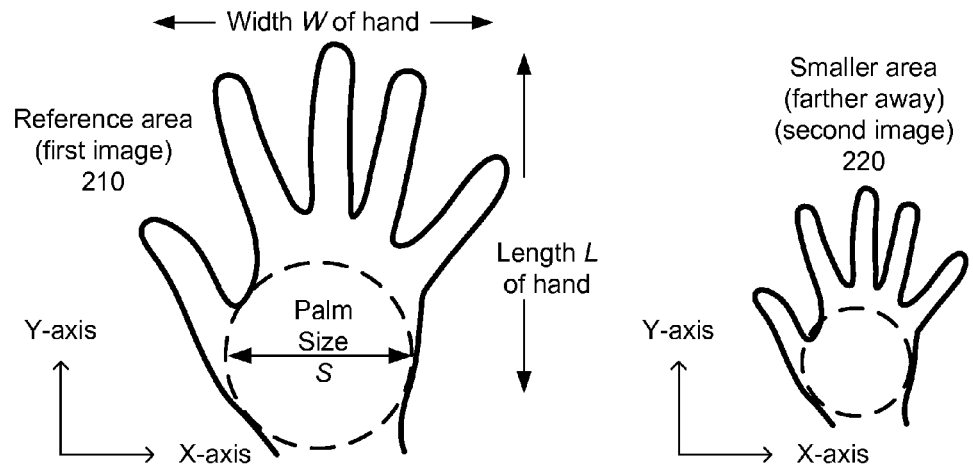
FIGS. 2-4 illustrate a change in hand size, in accordance with some embodiments.
Figure 4:
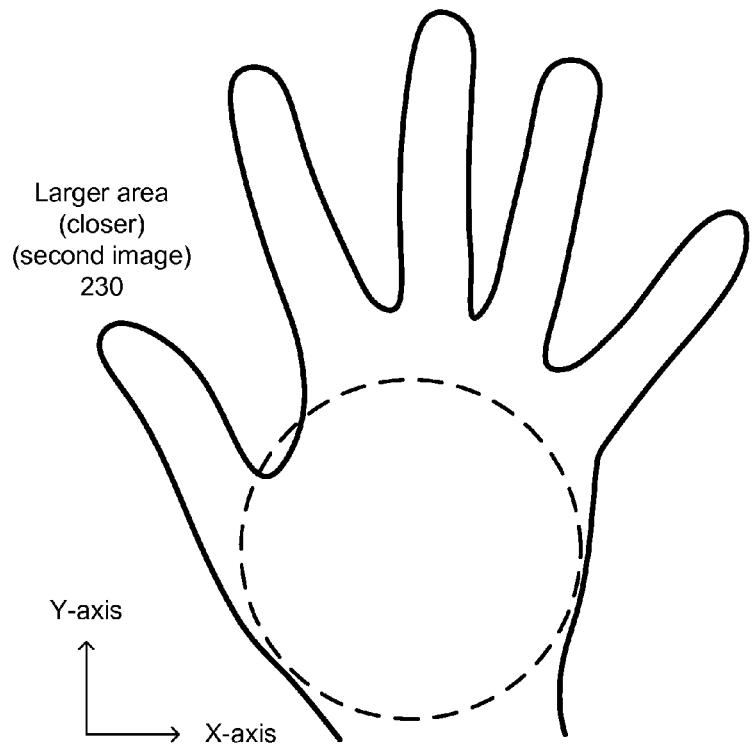

FIGS. 2-4 illustrate a change in hand size, in accordance with some embodiments. In FIG. 2, a first image contains a reference size 210 of a hand 200. Here, the reference size 210 is defined by a palm size of hand 200 in an open hand pose. Alternatively, a palm size of a hand 200, in a closed hand pose such as a fist or the like, may be used as defining the reference size 210. Still alternatively, a palm size of a hand, where the hand is performing a part of a hand gesture, may define an indication of the reference size 210. To set a reference size 210, a user may be prompted to hold a hand position over a mobile device 100. For example, the user may be requested to hold an open hand over the mobile device 100. In some embodiments, a user fixes a hand 200 at a variable (unknown) height above the mobile device 100. In such embodiments, a relative height may be determined. In other embodiments, a user fixes a hand 200 at a particular height above the mobile device 100. For example, the user may be instructed to fix an open hand 200 at one foot above the mobile device 100. In such embodiments, the user may be instructed to fix a hand at a particular height above the mobile device 100 that is dependent upon the field of view (FOV), range, and resolution of a particular camera and lens being used, to assure that the hand may be detected within a sufficient range of motion for a user to complete a gesture without unintentionally moving the hand outside the FOV, range, and resolution of the particular camera and lens being used.

In FIG. 3, a second image shows the same hand 200 farther away. When the hand 200 is farther away, the camera 110 captures a second image with a smaller size 230 when compared to the reference size 210. Before comparing the second image to the first image, the mobile device 100 may compensate for a field of view (FOV) of a particular camera and lens being used. Therefore, a hand size from the first (reference) image may be directly compared to a hand size from the second image. As such, a relative difference between lengths may be determined.

In FIG. 4, another second image shows the same hand 200 closer to the camera 110. When the hand 200 is closer, the camera 110 captures a second image with a larger size 220 when compared to the reference size 210. When compared to an indication of the reference size 210, an indication of the smaller size 230 or the larger size 220 results in a relative difference to the reference size 210.

Figure 5:
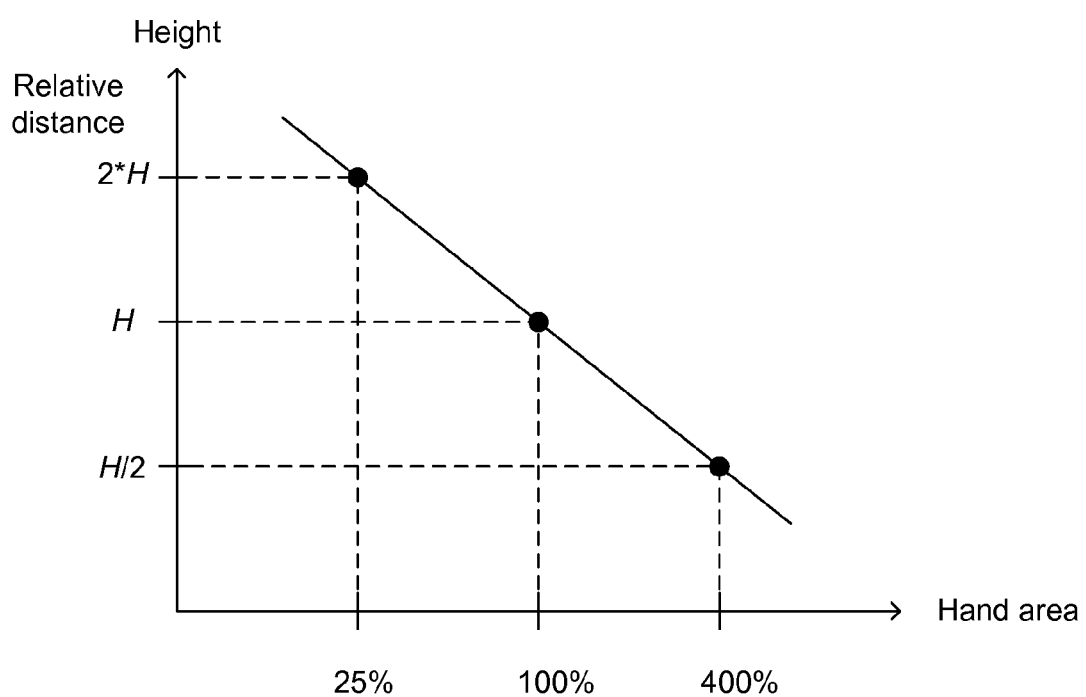
FIG. 5 plots a hand size verses a distance, in accordance with some embodiments.

FIG. 5 plots a hand size verses a distance, in accordance with some embodiments. Neither relative distance nor hand size is shown on a linear scale. Similar, the processor has compensated for effects of a FOV of a particular lens. The non-linear scales show a relationship between relative distance and hand size such that a translation between the two falls on a line. If drawn on a linear scale, the graph would appear having an inverse proportional relationship. That is, relative distance is proportion to an inverse of hand size after accounting for a particular FOV of a camera 110.

In FIG. 5, a relative distance is shown with respect to a hand size. The value of H may be unknown. A reference size 210 is set to 100% for a height H. When an image shows the hand 200 is 50% of the reference size 210 (e.g., a smaller size 230), the relative distance is 2*H. When an image shows the hand 200 is 200% of the reference size 210 (e.g., a larger size 220), the relative distance is H/2. If H is referred to as a relative height, 2*H and H/2 are determinable relative heights. Therefore, an arbitrary hand size may be translated to a relative distance above the camera 110, without calculation of the absolute height of the hand, and without knowledge of the absolute hand size or the assumption that the hand matches an anatomical model of a hand size. The graph may be used to determine a direction from a reference height H, wherein the reference height H results in an image of a hand 200 having a relative size 210. For example, the graph may be used to determine if a hand 200 is moving towards or away from a camera 110. In addition to direction, the graph may be used to compute a relative height with respect to the reference height H.

Figure 6:
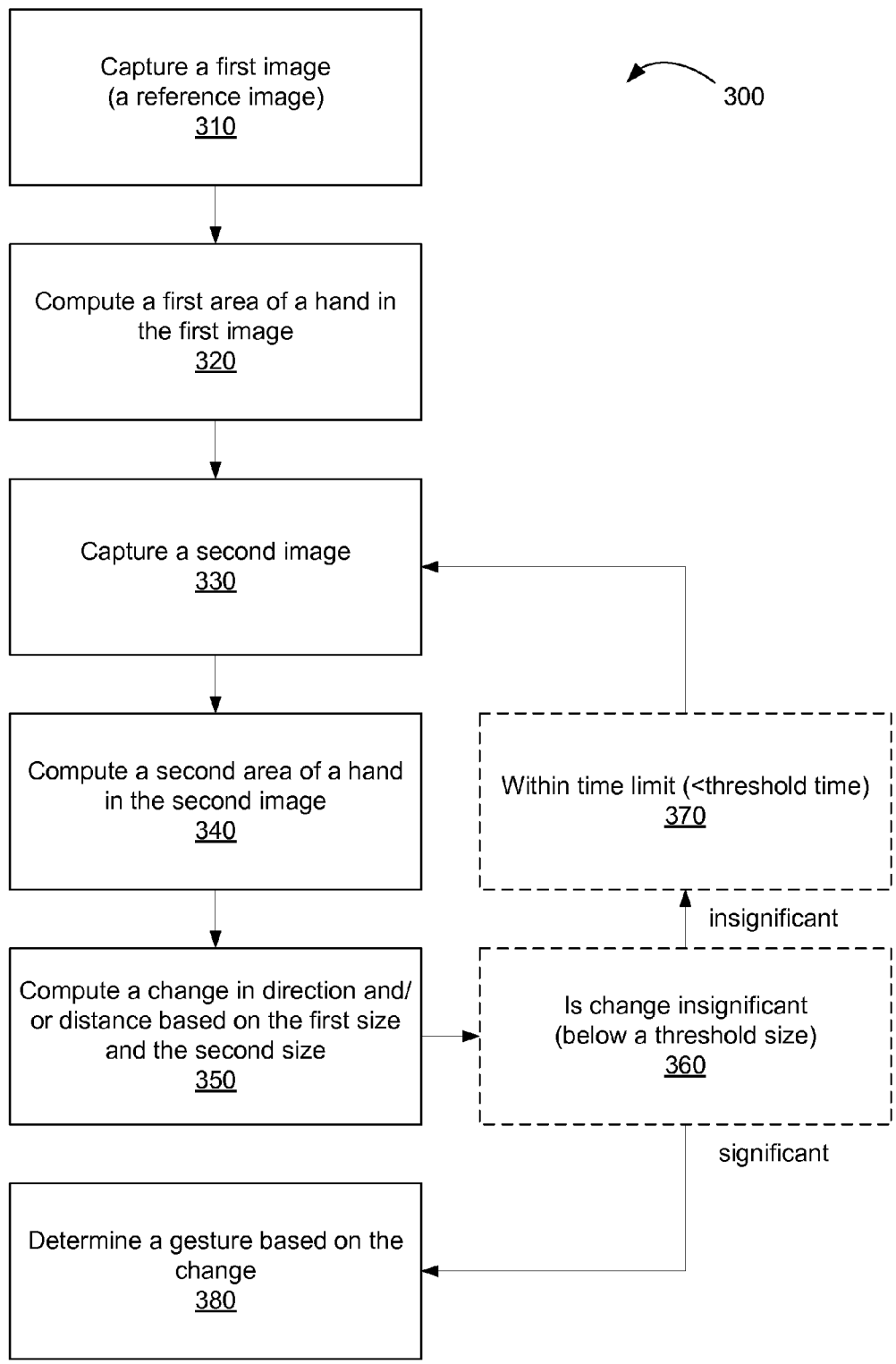
FIG. 6 shows a method, in accordance with some embodiments.

FIG. 6 shows a method 300, in accordance with some embodiments. At 310, a camera 110 captures a first image. The first image is a reference image containing a hand 200 having a reference size. At 320, a processor in a mobile device 100 computes an indication of the first size as a reference size. As previously stated, the indication of a size may be a size S corresponding to a diameter or an area of the palm. At 330, the camera 110 also captures a second image. Step 330 may occur before or after step 320. At 340, the processor computes an indication of the second size of the hand 200 within the second image. At 350, the processor computes a change between the first image and the second image wherein the change includes a direction and/or a distance based on the first indication of size and the second indication of size. The change may be only a direction, only a relative distance, or both a direction and a relative distance. For example, if the second size is less than the first size, the hand 200 has moved away from the reference height. If the second size is greater than the first size, the hand 200 has moved towards the reference height. Alternatively, two sequential images may be examined to determine whether the hand 200 is currently moving up (away from the camera 110) or down (towards the camera 110).

Optionally, at 360, a determination is made to check if a change is insignificant, for example, if the change is below a threshold size. If the change is insignificant, processing may continue at optional step 370 or again at step 330. If the change is significant, processing may continue at step 380.

At 370, a time limit T may be checked to see whether one interaction occurs within a single session. For example, processing at step 330 may continue only if a threshold time (e.g., T=5 seconds) has not been exceeded. During the time limit T, the change in palm size or area may be used to identify a push or a pull. In this case, a hand 200 stays within a viewing frame and moves in height. The computed height change may result in a gesture defining zooming in or out operation. Also in this case, a hand 200 may disappear from a viewing frame by being too low or too high along the Z-axis. For example, when a hand 200 is too close it occupies a majority of an image and cannot be detected. When a hand 200 is too far it is smaller than a defined minimum number of pixels for a hand 200. Alternatively, a hand 200 may disappear because it is outside of the X-Y plane of the camera 110. That is, the hand 200 exits a view of a camera 110. For example, a hand 200 may exit at a low height and then reappear at a higher height. Such a gesture includes a close interaction followed by a far interaction. At 380, the processor determines a gesture based on the change.

Figure 7A:
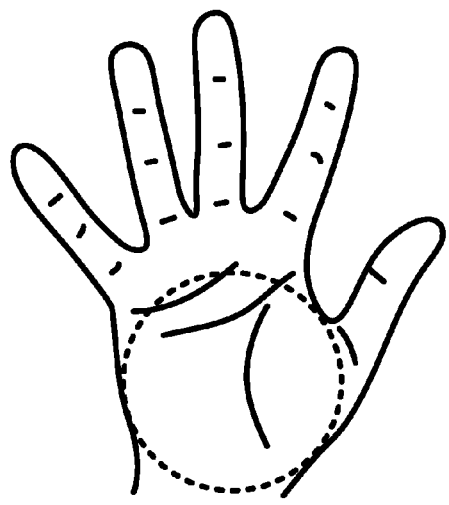
FIGS. 7A-7D illustrate a set of hand contours of common hand poses, and the largest circle that fit within each hand contour, in accordance with some embodiments.
Figure 7B:
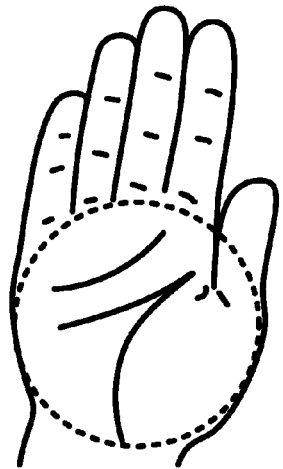
Figure 7C:
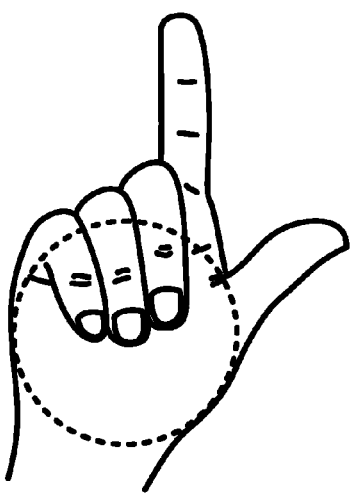
Figure 7D:

FIGS. 7A-7D illustrate a set of hand contours of common hand poses, and the largest circle that fit within each hand contour, in accordance with some embodiments. For many common hand poses, the largest circle within a silhouette of a hand corresponds closely to the palm, therefore a palm may be detected within a segmented contour of a hand, as the largest circle that fits within the hand contour. FIG. 7A shows an open hand with fingers and thumb spread out. FIG. 7B shows an open hand with fingers and thumb together. FIG. 7C shows partially closed hand with an index finger and a thumb pointing out. FIG. 7D shows closed hand with fingers and thumb together in a fits.

It should be apparent that the palm size remains fairly constant for these various poses, while other metrics of hand size such as hand length and hand area are more greatly affected by the hand pose.

Figure 8:
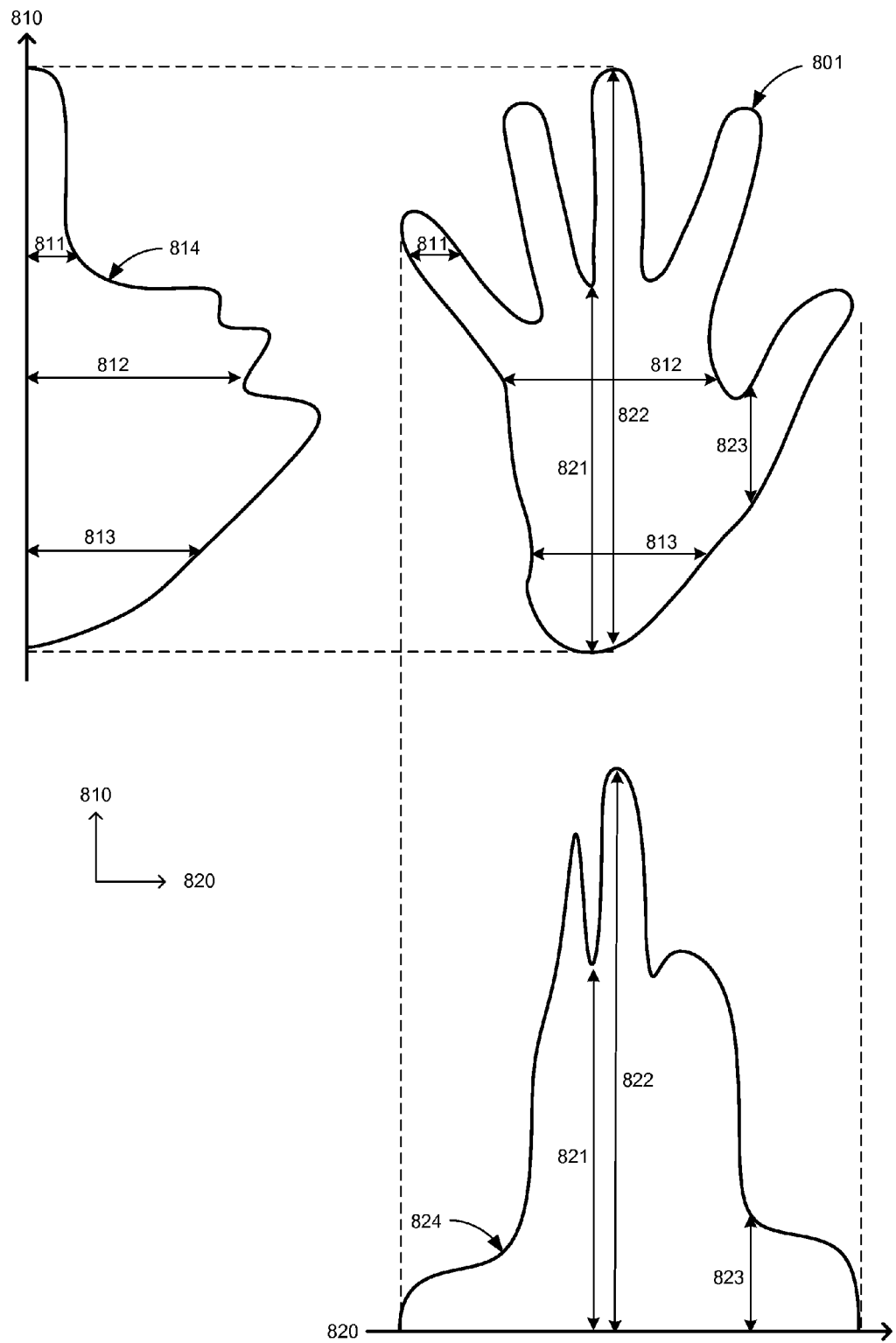
FIGS. 8 and 9 illustrate a method of computing an approximation of the largest circle that hits within a hand contour, in accordance with some embodiments.
Figure 9:
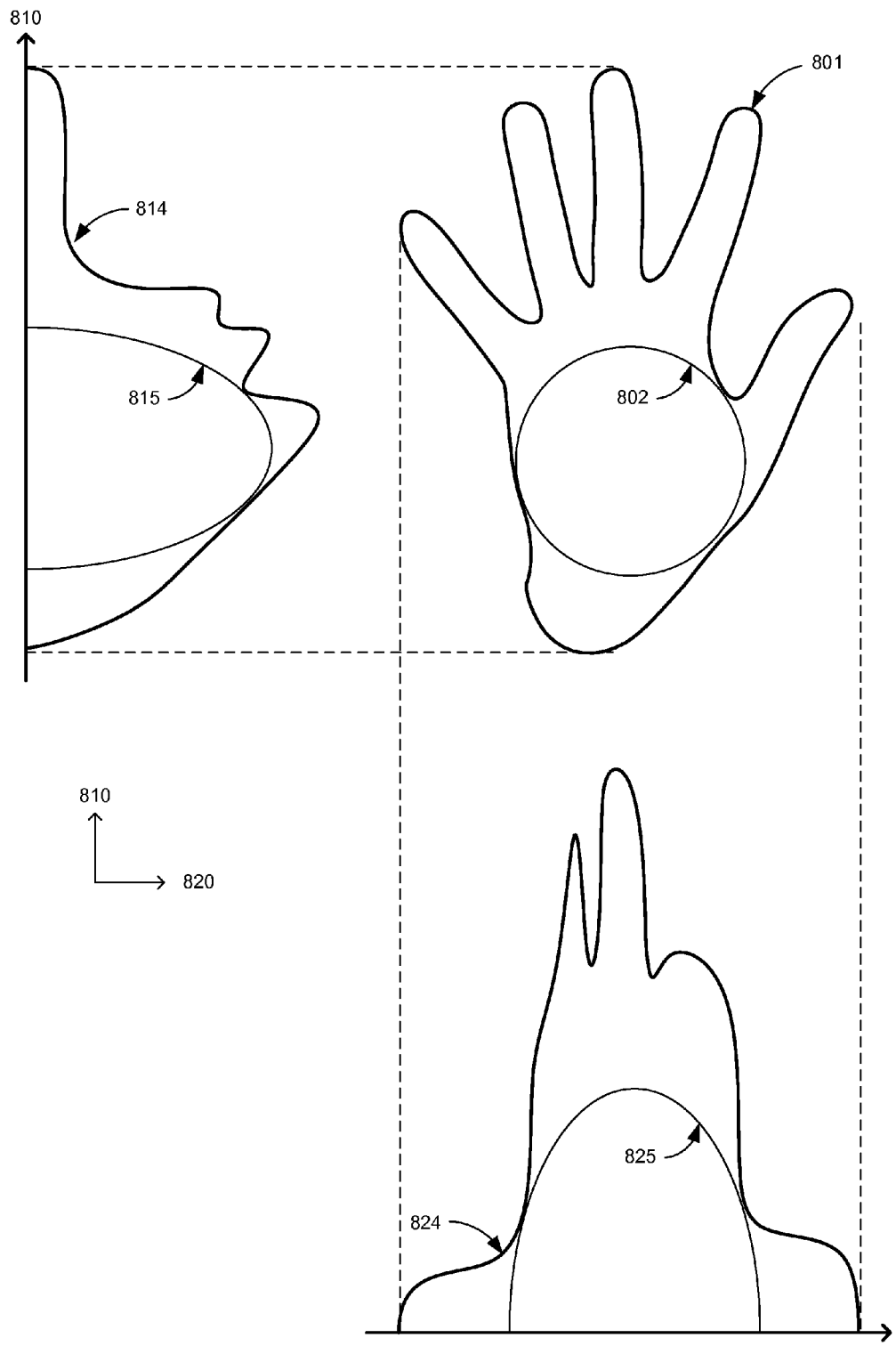

FIGS. 8 and 9 illustrate a method of computing an approximation of the largest circle that hits within a hand contour, in accordance with some embodiments. A palm size may be used as an approximation of the hand size by using the largest circle that fits within the hand contour. This approximation requires relatively little computation as compared to determining an area of a hand.

In FIG. 8, two axes 810 and 820 are identified. The axes may correspond to the length of the hand and the width of the hand. Alternatively, the axes may correspond to the vertical and horizontal axes of the image. The longest contagious segments (for example, 811, 812 and 813) perpendicular to axis 810 are projected along axis 810 to form a projected contour 814. It can be seen in this example that segments identified as 811, 812, and 813 within projected contour 814 match the length of corresponding segments 811, 812, and 814 within hand contour 801. Similarly, the longest contagious segments (for example 821, 822, 823) perpendicular to axis 820, are projected along axis 820 to form a projected contour 824.

In FIG. 9, within projected contour 814, the largest half-ellipse 815 is found Similarly, within projected contour 824, the largest half-ellipse 825 is found. Half-ellipses 815 and 825 may be back-projected into hand contour 801 to identify circle 802. Circle 802 is an approximation of the largest circle within the hand contour. Other shapes may be used instead of half-ellipses. For example, a half-circle, square or rectangle may be used.

In an alternative embodiment of a method of identifying a palm, the palm position is identified as the point furthest from any point on a hand and the palm radius is identified as the distance of that point to the closest point on the contour. This method may be computed as a series of morphology erosion operations computed on a segmentation of a hand, applied recursively until any further erosion results in a null image. The number of recursions equates to the radius of the palm and the remaining points represent the center of the palm.

Figure 10:
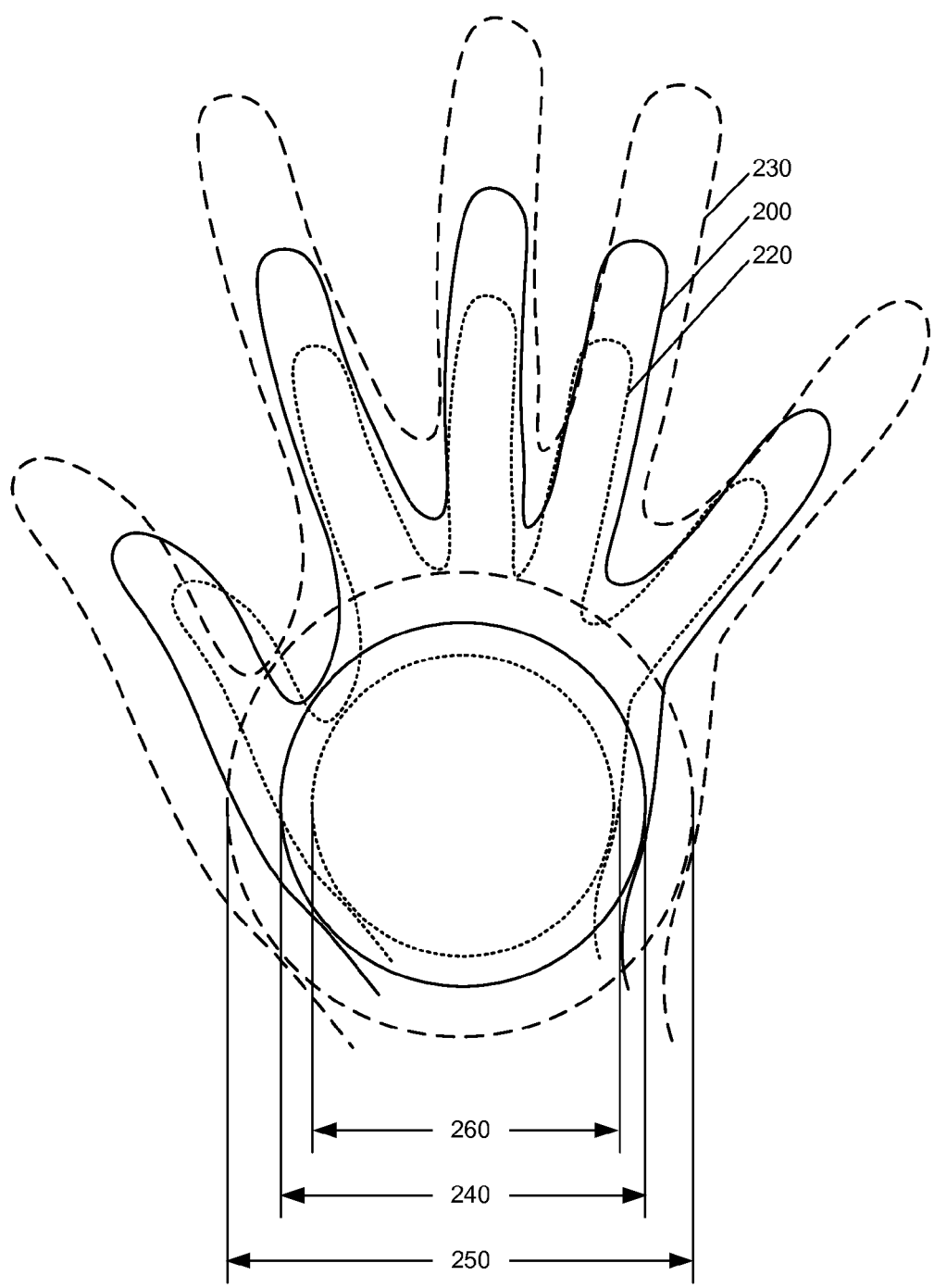
FIG. 10 shows two thresholds of a hand, in accordance with some embodiments.

FIG. 10 shows two thresholds of a hand 200, in accordance with some embodiments. A palm size 240 of a hand 200 is shown with a solid line. A threshold size increase to palm size 250, corresponding to hand 220, is shown. A threshold size decrease to palm size 260, corresponding to hand 230, is also shown. This threshold size increase or decrease may be used to determine whether a change is insignificant or significant.

Figure 11:
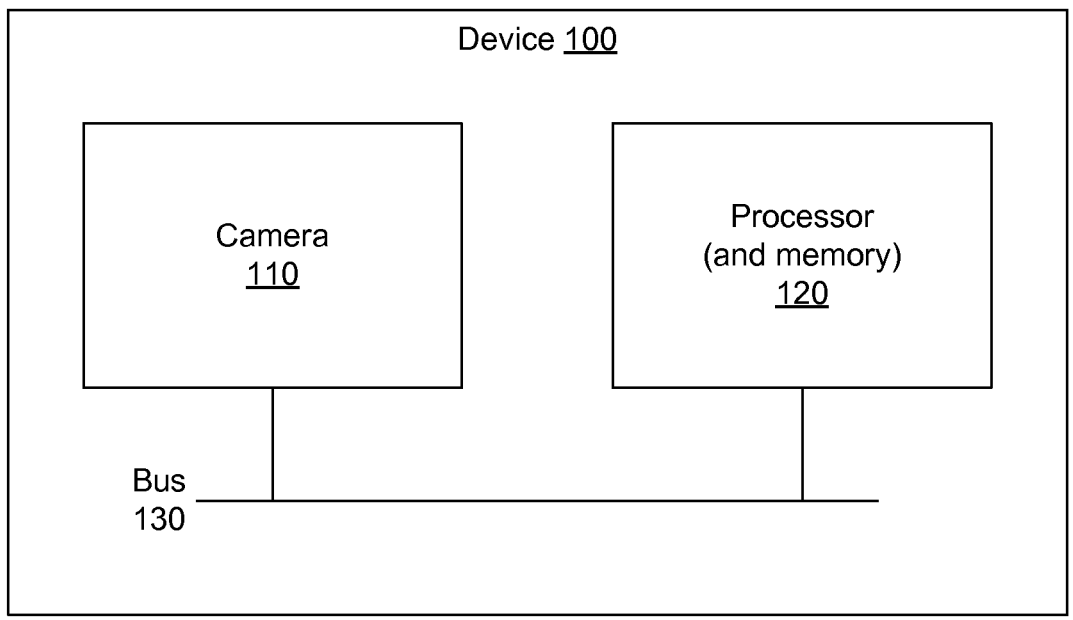
FIG. 11 illustrates a device, in accordance with some embodiments.

FIG. 11 illustrates a mobile device 100, in accordance with some embodiments. The mobile device 100 includes a camera 110 and a processor 120 having memory. The camera 110 is configured to capture a first image containing a hand 200 having a first size. The camera 110 also is configured to capture a second image containing the hand 200 having a second size. The processor 120 and memory are coupled to the camera, for example, via a bus 130. The processor 120 and memory comprise code to: (1) compute a first indication of the first size of the hand in the first image; (2) compute a second indication of the second size of the hand in the second image; (3) compute a change between the first image and the second image; and (4) determine the gesture based on computing the change.

The camera 110 acts as: (1) a means for capturing a first image containing a hand having a first size; and (2) a means for capturing a second image containing the hand having a second size. The processor 120 and memory act as: (1) a means for computing a first indication of the first size of the hand in the first image; (2) a means for computing a second indication of the second size of the hand in the second image; (3) a means for computing a change between the first image and the second image; and (4) a means for determining the gesture based on computing the change.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software code may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device for determining a gesture, the method comprising:
    capturing a first image containing a hand having a first size;
    filling the hand in the first image with a first circle;
    computing a first indication of the first size of the hand in the first image based on the first circle;
    capturing a second image containing the hand having a second size;
    filling the hand in the second image with a second circle;
    computing a second indication of the second size of the hand in the second image based on the second circle;
    computing a relative change between the first image and the second image; and
    determining the gesture based on the relative change.

2. The method of claim 1, wherein the first image and the second image are received from an optical camera.

3. The method of claim 1, wherein the first image and the second image are received from an infrared camera.

4. The method of claim 1, wherein the first image and the second image are received from an ultrasonic camera.

5. The method of claim 1, wherein the hand in the first image and the second image comprises an open palm.

6. The method of claim 1, further comprising:
    detecting the hand in the first image; and
    registering the first indication of the size as a reference hand size.

7. The method of claim 1, wherein the relative change indicates a direction and distance.

8. The method of claim 7, wherein computing the relative change results in a relative distance.

9. The method of claim 1, further comprising repeating acts of:
    re-capturing a next image containing the hand;
    re-computing an indication of the next size of the hand in the next image; and
    re-computing the relative change.

10. The method of claim 9, further comprising determining the relative change is less than a threshold.

11. The method of claim 9, further comprising determining a time, between capturing the first image and capturing the second image, is less than a threshold time.

12. The method of claim 1, further comprising determining difference between the first indication of size and the second indication of size is greater than a threshold.

13. The method of claim 1, further comprising interpreting the gesture.

14. A mobile device for determining a gesture, the mobile device comprising:
   a camera configured to:
      capture a first image containing a hand having a first size; and
      capture a second image containing the hand having a second size; and
   a processor coupled to the camera and comprising code to:
      fill the hand in the first image with a first circle;
      compute a first indication of the first size of the hand in the first image based on the first circle;
      fill the hand in the second image with a second circle;
      compute a second indication of the second size of the hand in the second image based on the second circle;
      compute a relative change between the first image and the second image; and
      determine the gesture based on the relative change.

15. The mobile device of claim 14, wherein the camera comprises an optical camera.

16. The mobile device of claim 14, wherein the camera comprises an infrared camera.

17. The mobile device of claim 14, wherein the camera comprises an ultrasonic camera.

18. The mobile device of claim 14, wherein the code to compute the relative change results in a relative distance.

19. A mobile device for determining a gesture, the mobile device comprising:
   means for capturing a first image containing a hand having a first size;
   means for filling the hand in the first image with a first circle;
   means for computing a first indication of the first size of the hand in the first image based on the first circle;
   means for capturing a second image containing the hand having a second size;
   means for filling the hand in the second image with a second circle;
   means for computing a second indication of the second size of the hand in the second image based on the second circle;
   means for computing a relative change between the first image and the second image; and
   means for determining the gesture based on computing the relative change.

20. The mobile device of claim 19, wherein the relative change indicates a direction and distance.

21. The mobile device of claim 20, wherein computing the relative change results in a relative distance.

22. The mobile device of claim 19, further comprising means for interpreting the gesture.

23. A non-transient computer-readable storage medium including program code stored thereon, comprising program code to:
   capture a first image containing a hand having a first size;
   fill the hand in the first image with a first circle;
   compute the first indication of the first size of the hand in the first image based on the first circle;
   capture a second image containing the hand having a second size;
   fill the hand in the second image with a second circle;
   compute the second indication of the second size of the hand in the second image based on the second circle;
   compute a relative change between the first image and the second image; and
   determine the gesture based on computing the relative change.

* * * * *